United States Patent
Miyahara

(10) Patent No.: US 9,001,865 B2
(45) Date of Patent: Apr. 7, 2015

(54) SYSTEM AND DEVICE FOR GENERATING REFERENCE SIGNAL, AND TIMING SIGNAL SUPPLY DEVICE

(75) Inventor: Kazunori Miyahara, Nishinomiya (JP)

(73) Assignee: Furuno Electric Company Limited, Hyogo (JP)

( * ) Notice: Subject to any disclaimer, the term of this patent is extended or adjusted under 35 U.S.C. 154(b) by 628 days.

(21) Appl. No.: 13/203,093

(22) PCT Filed: Apr. 7, 2010

(86) PCT No.: PCT/JP2010/056315
§ 371 (c)(1),
(2), (4) Date: Aug. 24, 2011

(87) PCT Pub. No.: WO2010/117016
PCT Pub. Date: Oct. 14, 2010

(65) Prior Publication Data
US 2011/0309871 A1      Dec. 22, 2011

(30) Foreign Application Priority Data

Apr. 9, 2009   (JP) ................... 2009-094664

(51) Int. Cl.
*H04B 1/00*    (2006.01)
*G01S 19/14*   (2010.01)
*H04B 1/707*   (2011.01)

(52) U.S. Cl.
CPC ....... *G01S 19/14* (2013.01); *H04B 2001/70706* (2013.01); *H04B 2201/70715* (2013.01)

(58) Field of Classification Search
CPC .............. H04B 1/707; H04B 1/70735; H04L 27/2647; H04L 1/06; H04L 7/0337; H04L 7/033; H04L 2027/0067

USPC ........... 375/145, 316, 354; 370/503; 455/502, 455/13.2
See application file for complete search history.

(56) References Cited

U.S. PATENT DOCUMENTS

| | | | |
|---|---|---|---|
| 6,031,601 A * | 2/2000 | McCusker et al. ........... 356/5.01 |
| 2001/0026239 A1 * | 10/2001 | Fenton ..................... 342/357.06 |
| 2002/0054611 A1 * | 5/2002 | Seta ............................ 370/503 |
| 2003/0058814 A1 | 3/2003 | Kim |

(Continued)

FOREIGN PATENT DOCUMENTS

| CN | 1411300 A | 4/2003 |
|---|---|---|
| CN | 1540884 A | 10/2004 |

(Continued)

OTHER PUBLICATIONS

Hewlett-Packard Company, "HP SmartClock Technology," Application Note 1279, Copyright 1998, 5966-0431E, pp. 10.

*Primary Examiner* — Ted Wang
(74) *Attorney, Agent, or Firm* — Global IP Counselors, LLP

(57) ABSTRACT

Provided is a timing signal supply device that can frequently perform a phase comparison on a side of receiving a supply of a timing signal and flexibly achieve various operation modes. A GPS receiver 11 includes a baseband processing module 16 and a PN code output terminal 26. The baseband processing module 16 performs a positioning calculation based on positioning signals received from GPS satellites. The PN code output terminal 26 is configured so as to be able to output, based on the result of the positioning calculation by the baseband processing module 16, a PN code that is repeated every second in synchronization with the coordinated universal time.

13 Claims, 6 Drawing Sheets

(56) References Cited

U.S. PATENT DOCUMENTS

| | | |
|---|---|---|
| 2004/0213367 A1 | 10/2004 | Han |
| 2011/0103337 A1* | 5/2011 | Bryant et al. ................. 370/329 |

FOREIGN PATENT DOCUMENTS

| | | |
|---|---|---|
| JP | 61-208329 A | 9/1986 |
| JP | 09-9270737 A | 10/1997 |
| JP | 2000-023245 A | 1/2000 |
| JP | 2003-189355 A | 7/2003 |
| JP | 2004-150892 A | 5/2004 |
| JP | 2004-328751 A | 11/2004 |
| JP | 2005-520447 A | 7/2005 |
| JP | 3811114 B2 | 8/2006 |
| JP | 4267092 B2 | 5/2009 |
| KR | 20000011176 A | 2/2000 |
| KR | 20030028058 A | 4/2003 |
| KR | 20040092259 A | 11/2004 |
| NZ | 521601 A | 3/2004 |

* cited by examiner

SYSTEM AND DEVICE FOR GENERATING REFERENCE SIGNAL, AND TIMING SIGNAL SUPPLY DEVICE

TECHNICAL FIELD

The present invention generally relates to a system for generating a reference signal by using a timing signal supply device for providing a timing signal utilizing a global positioning system.

BACKGROUND ART

This kind of timing signal supply device is disclosed in, for example, Patent Document 1. A GPS receiver disclosed in Patent Document 1 is used for system synchronization in a CDMA mobile communication network and configured to provide timing signals of TOD (Time of Date), 1 PPS (One Pulse per Second) and 10 MHz to a base-station system. With this configuration, the signals received from GPS satellites through a GPS antenna are inputted to the GPS receiver through a coaxial cable, and the GPS receiver demodulates these signals and creates the timing signals of TOD, 1 PPS and 10 MHz.

The configuration referred to as the "GPS receiver" (reference signal generation device) in Patent Document 1 is disclosed in, for example, Nonpatent Document 1. The reference signal generation device includes a PLL and is configured such that, during a normal operation, a voltage-controlled internal crystal oscillator is phase locked to a GPS signal through comparing a time difference between a 1 PPS signal from a GPS engine and a similar signal from the internal oscillator. Then, a signal of 10 MHz outputted from the voltage-controlled crystal oscillator (VCXO) and the 1 PPS signal obtained by dividing the frequency are outputted from the reference signal generation device.

REFERENCE DOCUMENT(S) OF CONVENTIONAL ART

Patent Document

Patent Document 1: JP2005-520447A

Nonpatent Document

Nonpatent Document 1: HP SmartClock Technology-Application Note 1279, Hewlett-Packard Company, Copyright 1998 5966-0431E, pp. 10.

DISCLOSURE OF THE INVENTION

Problem(s) to be Solved by the Invention

However, because the reference signal generation device disclosed in Nonpatent Document 1 is configured to compare the phases of the 1 PPS signal obtained from the GPS and the 1 PPS signal from the voltage-controlled internal crystal oscillator with each other, an opportunity for the phase comparison can only be secured once every second. Therefore, in a case where an oscillator with comparatively low-grade frequency-temperature characteristics and aging characteristics (e.g., a voltage-controlled crystal oscillator with a temperature compensation circuit (VCTCXO)) is used as an oscillator of a PLL circuit, a band of a loop filter of the PLL circuit becomes difficult to be narrowed down.

That is, in the configuration using such an oscillator, when comparing the phases of the 1 PPS signals at a long time cycle of once every second, there is a case where a deviation in frequencies caused in the oscillator between one phase comparison and the next phase comparison is accumulated and becomes large, thereby, if assuming that the band of the loop filter (low-pass filter) is narrowed down, a lock of the PLL circuit may be released. Therefore, it is necessary to expand a band width of the loop filter to some extent. However, in this case, an output frequency of the oscillator easily follows jitter that is included in the 1 PPS signal from the GPS and this has been the reason for decreasing the frequency stability of the output signal of the oscillator.

Alternatively, even in a case where one with comparatively high-grade frequency-temperature characteristics and aging characteristics (e.g., a voltage-controlled crystal oscillator with a thermostatic chamber (VCOCXO)) is used as the oscillator of the PLL circuit, when outputting, for example, a 1 PPS signal from the reference signal generation device, because a noise attenuation characteristics of the PLL cannot sufficiently be obtained, a spurious with a large phase noise is caused at every N times of 0.5 Hz.

Further, for a user's side, there is a case where the user wants to obtain 1 PPS signals synchronized with, for example, the coordinated universal time (UTC) from reference signal generation devices that are installed at a plurality of places (remotely located from each other). However, in such a case, with the conventional configuration, one timing signal supply device is required to be installed for each device and this has been the reason for the dramatic increase in cost especially in a case where the number of devices on the user's side is large.

The present invention is made in view of the above situations, and a main object thereof is to provide a timing signal supply device that can compare phases frequently on a side of using timing signals and has a wide scope for flexible utilization.

Means for Solving the Problems and Effects

The problems that the present invention is to solve are as described above, and next, means for solving the problems and effects caused thereby are described.

According to a first aspect of the invention, a reference signal generating system with the following configuration is provided. That is, the reference signal generating system includes a timing signal supply device and a reference signal generation device. The timing signal supply device includes a positioning calculation module and a spreading code output terminal. The positioning calculation module performs a positioning calculation based on positioning signals that are received from satellites of a global positioning system. The spreading code output terminal outpu is a timing signal synchronized with a predetermined timing by a periodic spreading code, based on the calculation result of the positioning calculation module. The reference signal generation device includes a code synchronizing circuit and a reference signal output module. The code synchronizing circuit can be locked to the spreading code supplied from the timing signal supply device. The reference signal output module outputs a signal from the code synchronizing circuit as a reference signal.

Thereby, as for the reference signal generation device, the code synchronization can frequently be performed, by the code synchronizing circuit, to the spreading code inputted from the timing signal supply device, and therefore, the output of the reference signal can be controlled at short time intervals. As a result, a reference signal with further high quality can be outputted from the reference signal output module.

The following configuration is preferred for the reference signal generating system. That is, this reference signal generating system may include a modulator and a demodulator. The modulator may modulate, by a carrier signal, the spreading code outputted from the timing signal supply device. The demodulator may obtain the spreading code by demodulating the signal that is transmitted after being modulated by the modulator. The spreading code obtained by the demodulator may be inputted to the reference signal generation device.

Thereby, the spreading code can be transmitted to a far distance due to the modulation, positions of the timing signal supply device and the reference signal generation device in relation to each other can flexibly be designed.

The following configuration is preferred for the reference signal generating system. That is, the reference signal generation device may include a return spreading code output terminal for returning by outputting the spreading code supplied from the timing signal supply device or the spreading code synchronized therewith to the timing signal supply device side. The reference signal generating system may include a delay amount detector. The delay amount detector may detect a delay amount of the return spreading code returned to the timing signal supply device side by being outputted from the return spreading code output terminal, with respect to the spreading code outputted from the timing signal supply device. A phase of the reference signal outputted from the reference signal generation device may be adjusted based on the delay amount.

Thereby, the reference signal generation device can provide a further accurate reference signal to a user side device.

According to a second aspect of the invention, a timing signal supply device with the following configuration is provided. That is, this timing signal supply device includes a positioning calculation module and a spreading code output terminal. The positioning calculation module performs a positioning calculation based on positioning signals that are received from satellites of a global positioning system. The spreading code output terminal outputs a timing signal synchronized with a predetermined timing by a periodic spreading code, based on the calculation result of the positioning calculation module.

Thereby, as for the machine on the side of receiving the supply of the timing signal, a code correlation value is acquired by a code correlation circuit at time intervals shorter than a second and a fine detailed control can be performed.

In the timing signal supply device, the spreading code is preferred to be a pseudonoise code.

Thereby, confidentiality of communication between the timing signal supply device and the machine on the side of being supplied with the timing signal.

In the timing signal supply device, a head timing output terminal for outputting a signal relating to a timing when a code pattern of the spreading code returns to the beginning is preferred to be included.

Thereby, as for the machine on the side of receiving the supply of the timing signal, by using the signal from the head timing output terminal, the code synchronization by, for example, the code correlation circuit can promptly be achieved.

In the timing signal supply device, it is preferred to be configured so that a plurality of spreading codes are superimposed with each other and outputted from the spreading code output terminal.

Thereby, in the single timing signal supply device, spreading codes different from each other can be outputted to a plurality of machines, and each of the machines in the output destinations, the timing signal targeted on each machine can separately be received. By this multiplexing of the communication, simplification of the system can be achieved in totally.

In the timing signal supply device, it is preferred to be configured so that another data signal is superimposed on the spreading code and outputted from the spreading code output terminal.

Thereby, as for the machine on the side of receiving the supply of the timing signal, various information other than the timing signal can be obtained from the timing signal supply device.

In the timing signal supply device, it is preferred to be configured so that information relating to a transmission delay caused by a connecting path connecting the timing signal supply device with an output destination device that is a destination of the output of the spreading code.

Thereby, as for the machine on the side of receiving the supply of the timing signal, by correcting the transmission delay, a timing as intended by the timing signal supply device can correctly be obtained.

Note that, in the above timing signal supply device, the configuration may be such that a phase of the spreading code to be outputted from the spreading code output terminal is adjusted to correct a transmission delay caused by a connecting path connecting the timing signal supply device with an output destination device that is a destination of the output of the spreading code.

Also in this case, as for the machine on the side of receiving the supply of the timing signal, a timing as intended by the timing signal supply device can correctly be obtained.

According to a third aspect of the invention, a reference signal generation device with the following configuration is provided. That is, this reference signal generation device includes a code synchronizing circuit and a reference signal output module. The code synchronizing circuit may be locked to a periodic spreading code synchronized with a predetermined timing. The reference signal output module outputs a signal from the code synchronizing circuit as a reference signal.

Thereby, the code synchronization can frequently be performed, by the code synchronizing circuit, to the spreading code that is inputted thereto, and therefore, the output of the reference signal can be controlled at short time intervals. As a result, a reference signal with further high quality can be outputted from the reference signal output module.

The following configuration is preferred for the reference signal generation device. That is, this reference signal generation device may include a delay signal input terminal and an adjuster. The delay signal input terminal may be inputted with a delay signal that is a signal relating to a delay. The adjuster may adjust a phase of the reference signal to be outputted from the reference signal output module, based on the delay signal.

Thereby, the delay signal is acquired on the reference signal generation device side to correct the transmission delay, and therefore, a reference signal with a correct timing can be obtained.

In the reference signal generation device, the reference signal output module is preferred to include a spreading code output terminal for outputting the periodic spreading code synchronized with the code synchronizing circuit.

Thereby, a spreading code with a correct timing can be provided to the user side device.

MODES OF CARRYING OUT THE INVENTION

Figure 1:
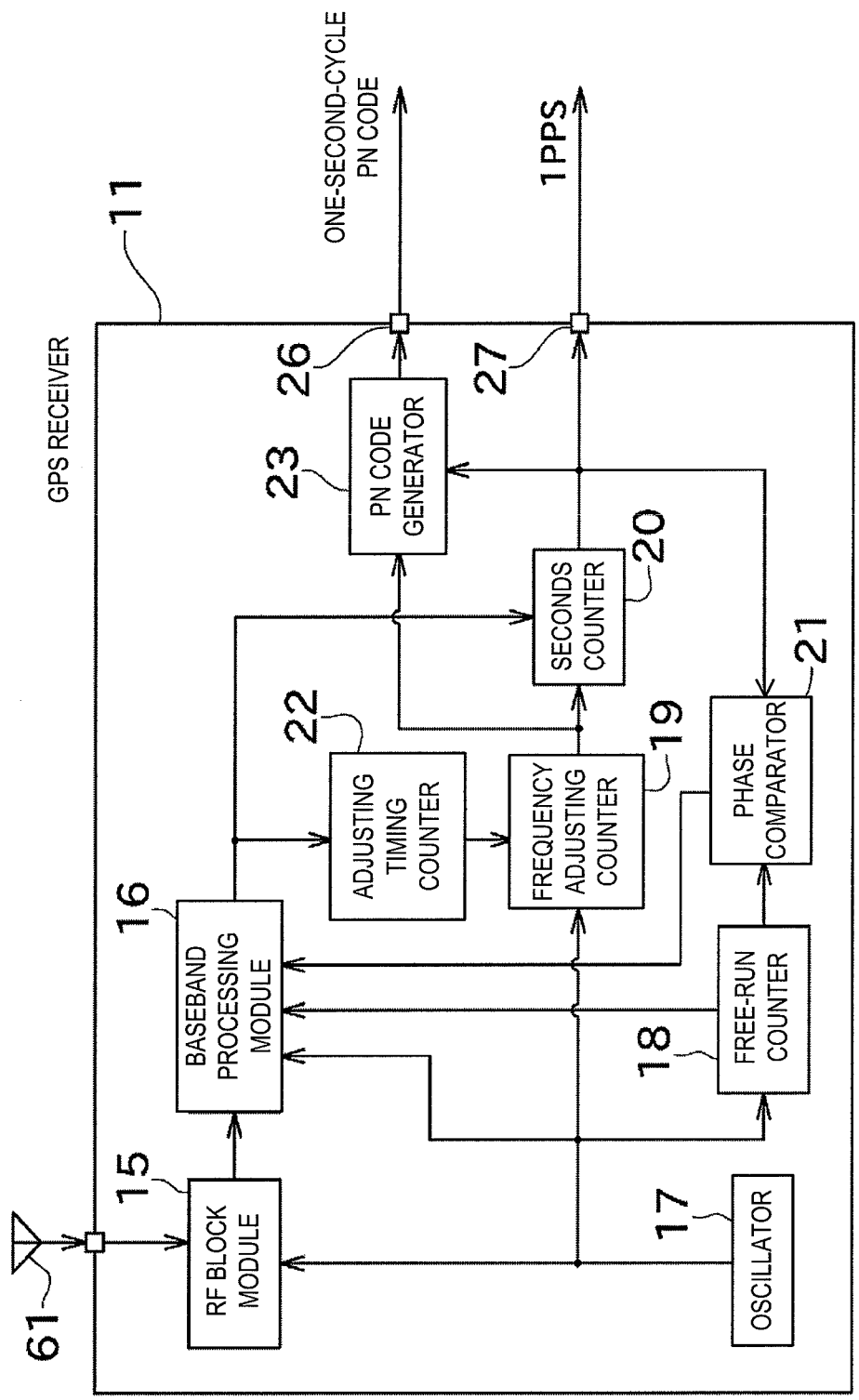
FIG. 1 is a block diagram showing an electrical configuration of a GPS receiver according to a first embodiment of the present invention.

Next, embodiments of the present invention are described with reference to the drawings. FIG. 1 is a block diagram showing an electrical configuration of a GPS receiver 11 according to a first embodiment of the present invention.

The GPS receiver 11 in FIG. 1 that serves as a timing signal supply device is configured such that a periodic pseudonoise code (PN code) that is repeated every second in the coordinated universal time (UTC), and a 1 PPS signal can be outputted by using a GPS that serves as a global positioning system. The GPS receiver 11 includes a PN code output terminal (spreading code output terminal) 26 for outputting the PN code and a head timing signal output terminal (first timing output terminal) 27 for outputting a pulse signal (the 1 PPS signal) matched with a timing corresponding to the beginning of a code pattern of the PN code.

In addition, the GPS receiver 11 includes an RF block module 15, a baseband processing module (position calculation module) 16, an oscillator 17, a free-run counter 18, a frequency adjusting counter 19, a seconds counter 20, a phase comparator 21, an adjusting timing counter 22, and a PN code generator 23.

The RF block module 15 is configured to suitably perform processing, such as amplification and digital conversion of an analog signal received from a GPS antenna 61, and output it to the baseband processing module 16. Although the detailed description of the configuration of the RF block module 15 is omitted because the configuration thereof is commonly known, the RF block module 15 includes an amplifier, a mixer for down conversion, a band pass filter, an A/D converter, and a PLL circuit.

The baseband processing module 16 is configured to perform a demodulation of a navigation message, a calculation of orbits of satellites, and a position calculation. Specifically, the baseband processing module 16 locks a DLL circuit having a code correlator to C/A codes that are a kind of the pseudonoise code included in each of radio waves from the GPS satellites and, thereby obtains a radio wave propagation time length. Then, the baseband processing module 16 reads out the navigation messages carried within the C/A codes to acquire the orbits of the satellites, and calculates the position of the GPS receiver (GPS antenna 61) and an error of a clock on the GPS receiver side by a commonly known method. Thereby, the baseband processing module 16 can obtain a correct time synchronized with highly accurate clocks mounted on the GPS satellites by the above described position calculation.

The oscillator 17 is constituted with, for example, a temperature compensated crystal oscillator (TCXO). A signal (local signal) with a predetermined frequency that this oscillator 17 generates is used as a reference signal for the RF block module 15 to down convert an inputted frequency. Further, the signal of the oscillator 17 is inputted to the baseband processing module 16 and is used as, for example, a sampling clock in the code correlator. Additionally, the signal of the oscillator 17 is inputted to the free-run counter 18 and the frequency adjusting counter 19.

The free-run counter 18 generates a one-second timing signal every time a predetermined number of clock signals from the oscillator 17 is counted. The one-second timing signal is inputted to the phase comparator 21 as well as to the baseband processing module 16. The baseband processing module 16 can acquire a clock drift of the free-run counter 18 and an offset with respect to a single second of the coordinated universal time (UTC) by using the result of the above described position calculation and the single-second timing signal.

The frequency adjusting counter 19 generates a pulse signal X times per second by dividing the frequency of the signal from the oscillator 17 and can output them to the seconds counter 20 and the PN code generator 23. The frequency adjusting counter 19 is an integer-dividing type frequency divider, and a frequency dividing ratio thereof can suitably be switched. The change of the frequency dividing ratio is performed when a change timing signal from the adjusting timing counter 22 is inputted to the frequency adjusting counter 19.

For example, in a case where the oscillating frequency of the oscillator 17 is 10 MHz and the frequency dividing ratio of the frequency adjusting counter 19 is 1/10,000, the frequency adjusting counter 19 can generate a pulse signal 1,000 times per second (X=1,000). Further, the diving ratio of the frequency adjusting counter 19 can be switched between, for example, 1/10,000 and 1/10,001 based on the signal from the adjusting timing counter 22.

The seconds counter 20 is configured as a frequency divider of which a frequency dividing ratio can be changed. The seconds counter 20 divides the signal outputted from the frequency adjusting counter 19 to generate a pulse signal once every second (1 PPS signal). For example, in the case where the number of times that the pulse signal is inputted from the frequency adjusting counter 19 to the seconds counter 20 is 1,000 as described above, the seconds counter 20 is configured as a 1,000 frequency divider, The 1 PPS signal which the seconds counter 20 outputs is further outputted from the head timing signal output terminal 27. In addition, the 1 PPS signal is also inputted to the phase comparator 21 and the PN code generator 23. The frequency dividing ratio of the seconds counter 20 can suitably be changed based on the signal from the baseband processing module 16.

The phase comparator 21 compares phases of the one-second-cycle timing signal outputted from the free-run counter 18 and the 1 PPS signal outputted from the seconds counter 20 with each other and generates a signal indicating a phase difference therebetween (phase difference signal). The phase difference signal is outputted from the phase comparator 21 to the baseband processing module 16.

The adjusting timing counter 22 is configured as a frequency divider of which a frequency dividing ratio can be set. The adjusting timing counter 22 is configured to repeat counting up to a set maximum value and once reaching the maximum value, reset itself to be zero. At a timing when a counting value is reset to zero, the adjusting timing counter 22 transmits the change timing signal to the frequency adjusting counter 19.

The PN code generator 23 is configured to use the pulse signal from the frequency adjusting counter 29 as a clock so as to generate a pseudonoise code (pseudo random noise code, PN code). Because the PN code generator 23 operates to return to the beginning of the PN code pattern every time the 1 PPS signal is inputted from the seconds counter 20, a signal of which a PN code of the same pattern is repeated every second is generated.

Here, in the case where the frequency adjusting counter 19 generates the pulse signal 1,000 times per second as in the above example, a signal of which a PN code with a code length of 1,000 is repeated every second is outputted from the PN code generator 23. Note that, although the PN code length of the PN code generator 23 is usually set to be $2^n-1$, in this embodiment, because the generating clock of the PN code is 1 kHz, by using the PN code generator 23 where its code length is 1023, only the 1,000 chips on the beginning side may be used. The signal from the PN code generator 23 is outputted from the PN code output terminal 26 and is supplied to the outside.

With the above configuration, the baseband processing module 16 suitably controls the frequency dividing ratio of the seconds counter 20 based on the clock offset obtained from the position calculation. Thereby, an edge of the 1 PPS signal (e.g., a rising edge of the pulse), which is generated by the seconds counter 20, is correctly matched with a single second in the UTC. Further, because the 1 PPS signal is inputted to the PN code generator 23 as the reset signal, the beginning of the PN code outputted from the PN code generator 23 is correctly aligned with respect to a single second in the UTC.

Further, the baseband processing module 16 obtains a drift amount of the oscillator 17 based on the phase difference signal (the signal indicating the phase difference between the single-second timing signal of the free-run counter 18 and the 1 PPS signal of the seconds counter 20) inputted from the phase comparator 21, and controls the frequency adjusting counter 19 and the adjusting timing counter 22 so as to cancel the drift (clock drift).

For example, a case where a frequency deviation of 1 ppm is occurred to the oscillator 17 and it actually oscillates at 10 MHz+10 Hz, while, ideally, it is supposed to oscillate at 10 MHz is considered. In this situation, if the frequency dividing ratio of the frequency adjusting counter 19 is set to be 1/10,000, the output frequency of the frequency adjusting counter 19 is 1,000.001 Hz, and if the frequency dividing ratio of the frequency adjusting counter 19 is set to be 1/10,001, the output frequency of the frequency adjusting counter 19 is 999.901 Hz.

Therefore, if the frequency dividing ratio of the frequency adjusting counter 19 is controlled to be 1/10,000 for 99 times among 100 times and 1/10,001 for the remaining one time through the adjusting timing counter 22, an average value of the output frequency of the frequency adjusting counter 19 becomes approximately 1000.000,000,098,99 Hz (=1 kHz+ $9.899 \times 10^{-8}$ Hz). Therefore, the frequency of the 1 PPS that is obtained by dividing the frequency with the seconds counter 20 becomes 1 Hz+$9.899 \times 10^{-11}$. Note that, by taking the fraction numbers into account, accurately obtaining the signal of 1 kHz and the 1 PPS signal is also possible.

As above, the beginning of the pattern of the PN code which the PN code generator 23 generates and is outputted from the PN code output terminal 26 can correctly be aligned with respect to a single second in The UTC.

Figure 2:
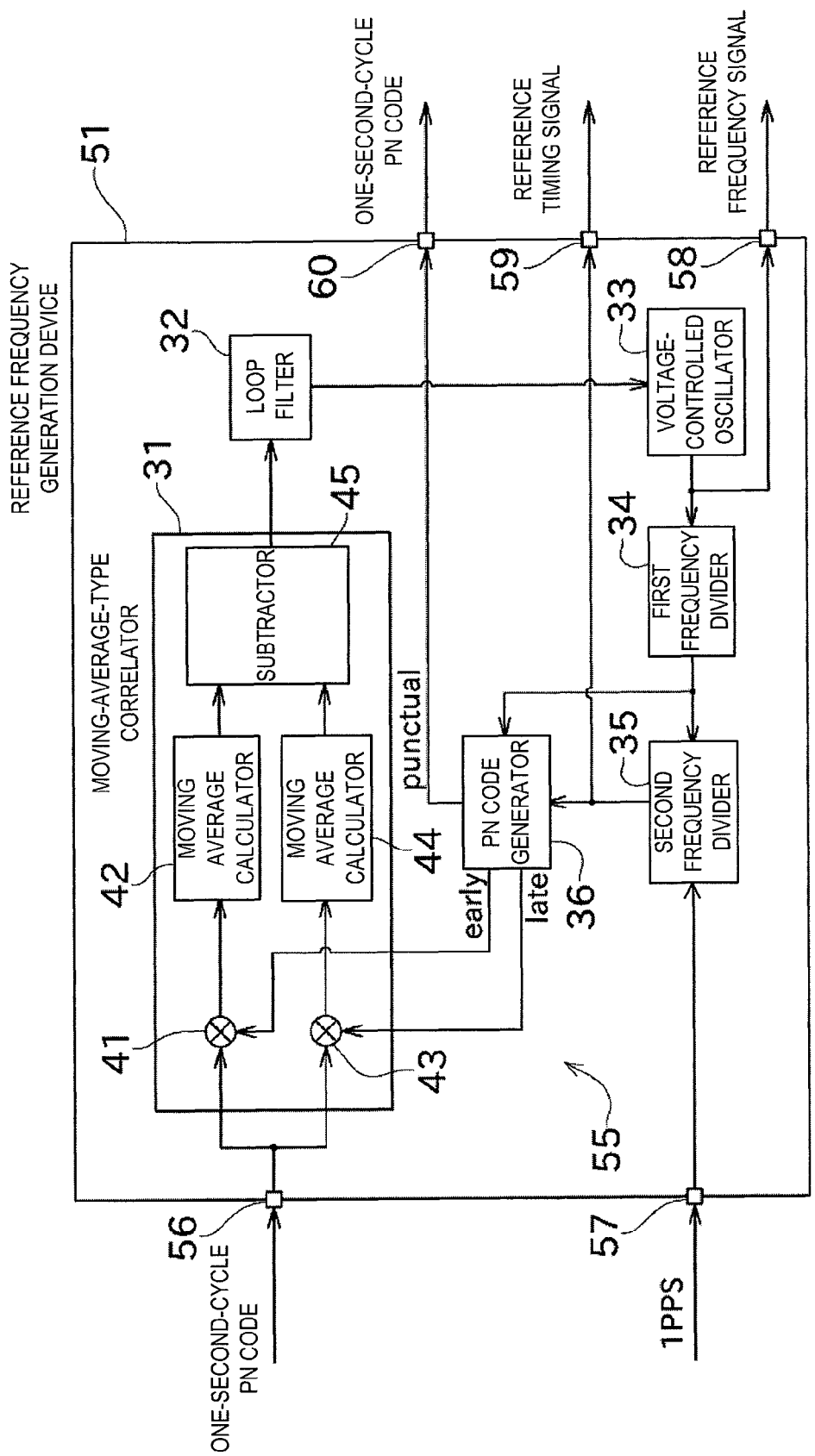
FIG. 2 is a block diagram showing an electrical configuration of a reference frequency generation device of the first embodiment.

Next, a reference frequency generation device (reference signal generation device) 51 is described with reference to FIG. 2. FIG. 2 is a block diagram showing an electrical configuration of the reference frequency generation device 51.

The reference frequency generation device 51 in FIG. 2 is configured to be inputted, as a reference signal, with the PN code (hereinafter, may be referred to as "a one-second-cycle PN code" meaning the PN code that is repeated every second) outputted from the GPS receiver 11, and to output reference signals synchronized with the one-second-cycle PN code (a reference frequency signal, a reference timing signal, and the one-second-cycle PN code).

This reference frequency generation device 51 includes a PN code input terminal 56 for inputting the one-second-cycle PN code which is from the GPS receiver 11; and a 1 PPS signal input terminal 57 for inputting the 1 PPS signal outputted from the GPS receiver 11. Also, the reference frequency generation device 51 includes a first output terminal (first reference signal output terminal) 58 for outputting the reference frequency signal at 10 MHz; a second output terminal (second reference signal output terminal) 59 for outputting the reference timing signal which is 1 PPS; and a third output terminal (third reference signal output terminal) 60 for outputting the one-second-cycle PN code.

The reference frequency generation device 51 includes a DLL circuit 55 that serves as a code synchronizing circuit. The DLL circuit 55 includes a moving-average-type correlator 31, a loop filter 32, a voltage-controlled oscillator (VCO) 33, a first frequency divider 34, a second frequency divider 35, and a PN code generator 36.

The moving-average-type correlator 31 is configured to include code correlators of an early sequence and a late sequence. The early-side code correlator includes an XOR circuit 41 and a moving average calculator 42. Similarly, the late-side code correlator includes an XOR circuit 43 and the moving average calculator 44.

The one-second-cycle PN code outputted from the GPS receiver 11 and an internal PN code that is generated by the PN code generator 36 are inputted to the XOR circuit 41 of the early-side correlator. Note that, a phase of the internal PN code, which is inputted from the PN code generator 36 to the XOR circuit 41, is advanced compared to the PN code by 0.5 chips than normal (later described early-PN code). A signal from the XOR circuit 41 is inputted to the moving average calculator 42.

Meanwhile, the one-second-cycle PN code outputted from the GPS receiver 11 and an internal PN code that is generated by the PN code generator 36 are also inputted to the XOR circuit 43 of the late-side correlator. Note that, a phase of the internal PN code, which is inputted from the PN code generator 36 to the XOR circuit 43, is delayed compared to the PN code by 0.5 chips than normal (later described late-PN code). A signal from the XOR circuit 43 is inputted to the moving average calculator 44.

Each of the moving average calculators 42 and 44 included in the two code correlators, is constituted with, for example, an adder, and calculates moving average for the output signals of the XOR circuits 41 and 43. A time range where the average is calculated by the moving average calculators 42 and 44 may be, for example, one second. The values of the moving averages obtained by the two moving average calculators 42 and 44 are inputted to a subtractor 45.

The subtractor 45 subtracts the moving average value of late side from the moving average value of the early side and outputs a signal indicating the obtained value to the loop filter 32.

The loop filter 32 is constituted with, for example, a low-pass filter, and generates a voltage control signal by equalizing temporally levels of the signal obtained from the subtractor 45. The voltage control signal generated by the loop filter 32 is inputted to the voltage-controlled oscillator 33.

The voltage-controlled oscillator 33 is configured as, for example, a crystal oscillator (VCXO) and outputs a signal at a frequency corresponding to the voltage control signal inputted from the loop filter 32. In this embodiment, in a state in which the DLL circuit 55 is locked to the one-second-cycle PN code (reference signal) from the GPS receiver 11, the frequency of the output signal of the voltage-controlled oscillator 33 is controlled to be 10 MHz. The signal generated by the voltage-controlled oscillator 33 is outputted to the first output terminal 58. The output signal of the voltage-controlled oscillator 33 is also inputted to the first frequency divider 34.

The first frequency divider 34 divides the signal at 10 MHz inputted from the voltage-controlled oscillator 33 by a frequency dividing ratio of 1/10,000 and generates a signal at 1 kHz. The signal generated by the first frequency divider 34 is outputted to the PN code generator 36 and used as a clock for the generation of the PN code. Further, the output signal of the first frequency divider 34 is inputted to the second frequency divider 35.

The second frequency divider 35 divides the signal at 1 kHz inputted from the first frequency divider 34 by a ratio of 1/1,000 and generates a signal at 1 Hz (1 PPS signal). The signal at 1 Hz, which the first frequency divider 34 outputs, is outputted to the PN code generator 36 as a reset signal. Further, a signal that is outputted from the second frequency divider 35 is outputted to the second output terminal 59 as a 1 PPS signal (reference timing signal).

The 1 PPS signal from the GPS receiver 11 is inputted to the second frequency divider 35 through the 1 PPS signal input terminal 57. The second frequency divider 35 is configured such that a frequency dividing ratio thereof can be changed. The second frequency divider 35 is configured to he able to, in an initial state in which the DLL circuit 55 is not locked to the one-second-cycle PN code that serves as the reference signal (a searching process of the PN code), suitably adjust the frequency dividing ratio of itself based on the 1 PPS signal from the GPS receiver 11 and transmit the reset signal of which a timing is substantially matched with the 1 PPS signal.

The PN code generator 36 can use the signal at 1 kHz inputted from the first frequency divider 34 as a clock signal and generate a PN code. The PN code which the PN code generator 36 generates has the same pattern as the one which the PN code generator 23 of the GPS receiver 11 generates (replica PN code).

Because the PN code generator 36 operates to return to the beginning of the pattern of the PN code every time the 1 PPS signal is inputted from the second frequency divider 35, a signal of which the PN code in the same pattern is repeated every second is generated. This one-second-cycle-cycle PN code, which the PN code generator 36 generates, is outputted to the third output terminal 60.

The PN code generator 36 is configured to be able to output the above one-second-cycle PN code and, in addition, the PN code of which the phase is advanced by 0.5 chips and the PN code of which the phase is delayed by 0.5 chips as well. Note that, hereinafter, the PN code to serve as a reference (PN code outputted from the third output terminal 60) may be referred to as "the punctual-PN code", the PN code with advanced phase may be referred to as "the early-PN code", and the PN code with delayed phase may be referred to as "the late-PN code."

The early-PN code is inputted to, within the moving-average-type correlator 31, the XOR circuit 41 for the code correlator on the early side. Further the late-PN code is inputted to, within the moving-average-type correlator 31, the XOR circuit 43 for the code correlator on the late side.

With the above configuration, a case where the punctual-PN code which the PN code generator 36 generates is slightly later than the one-second-cycle PN code (hereinafter, referred to as "the reference PN code") that is inputted from the PN code input terminal 56 is considered here. In this case, because phases of the early-PN code and also the late-PN code are similarly delayed, the reference PN code has a stronger correlation with the early-PN code than with the late-PN code. Therefore, an output value (i.e., a value of the correlation value on the early side after being subtracted by the correlation value on the late side) of the subtractor 45 becomes larger than 0.

On the other hand, in a case where the punctual-PN code is slightly advanced than the reference PN code, because phases of the early-PN code and the late-PN code correspondingly advance, the reference PN code has a stronger correlation with the late-PN code than with the early-PN code. Therefore, the output value (i.e., the value of the correlation value on the early side after being subtracted by the correlation value on the late side) of the subtractor 45 becomes smaller than 0.

By utilizing this, the loop filter 32 of this embodiment adjusts the voltage control signal to be outputted to the voltage-controlled oscillator 33 so that the calculation result of the subtractor 45 of the moving-average-type correlator 31 approaches 0. Thereby, the punctual-PN code to be outputted from the PN code generator 36 can highly accurately be matched with the reference PN code to be inputted thereto.

As above, in this embodiment, not the single pulse signal that is inputted once every second (1 PPS signal) but the one-second-cycle PN code that is continuously inputted is used as the reference signal. Therefore, the phase comparison between the output waveform of the PN code generator 36 and the reference signal can frequently be performed (e.g., the comparison may be performed as frequently as 10 to 1,000 times per second). Thereby, the voltage control signal of the voltage-controlled oscillator 33 can be adjusted in the early stage to support the above situation before the deviation of the frequency of the voltage control signal of the voltage-controlled oscillator 33 becomes large. Therefore, even if the band width of the DLL circuit 55 is narrowed down to be small (i.e., even if the cutoff frequency of the low-pass filter of the loop filter 32 is lowered), the lock of the DLL circuit 55 becomes difficult to be released. As a result, because a time constant of the loop filter 32 can further be increased, a high quality signal in which jitter is suppressed can stably be outputted.

Figure 3:
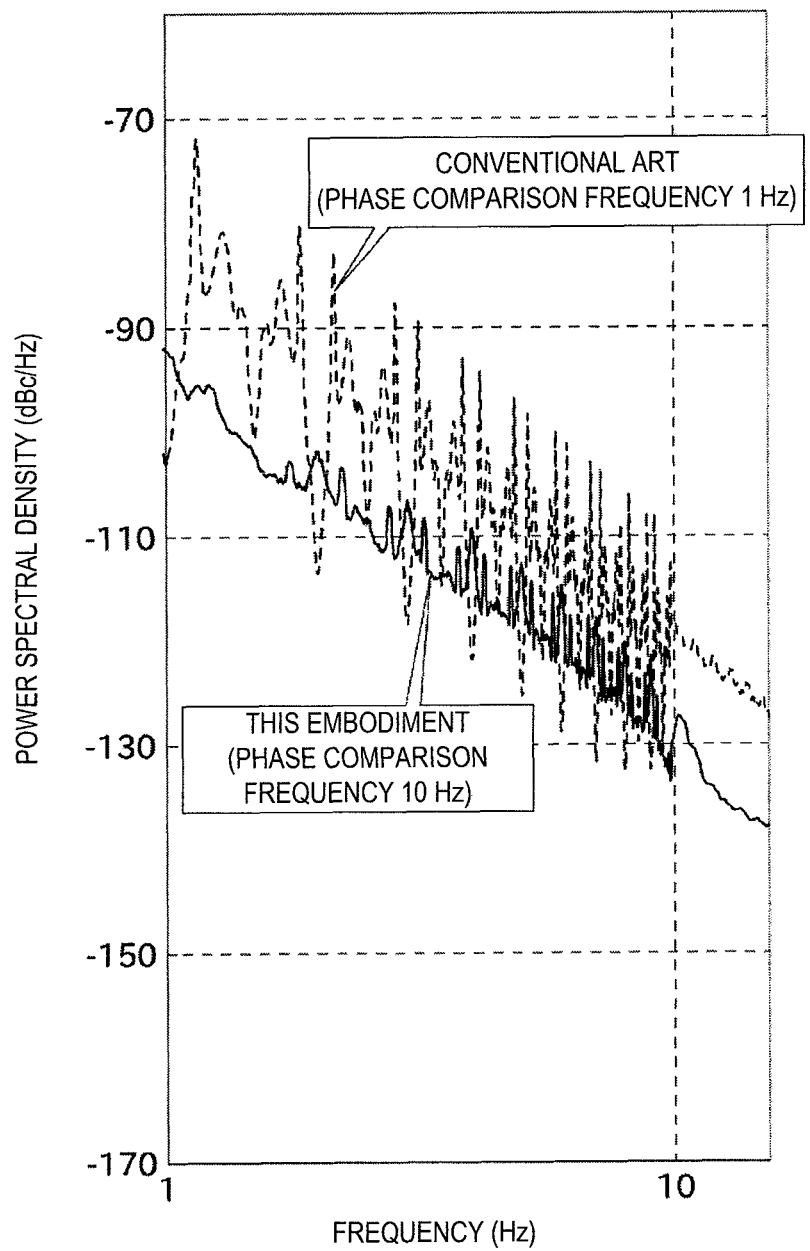
FIG. 3 is a spectrum chart showing spurious intensities of output signals of the reference frequency generation device in a manner of comparison between this embodiment of the present invention and the conventional art.

Spurious intensities in the case of the conventional art in which, with the 1 PPS signal as the reference signal, the phase comparison is performed once every second and the case of performing the phase comparison ten times every second according to this embodiment are shown in a spectrum chart in FIG. 3 in a manner of comparison with each other. Note that, in the chart of FIG. 3, the vertical axis indicates a power spectral density and the horizontal axis indicates a frequency in a logarithmic scale.

As above, the curve line in FIG. 3 indicated by the broken line shows the spurious intensity in the case where the frequency of the comparison of the phase is once every second (the configuration of the conventional art). As it is clear from the chart, when the comparison frequency of the phase (in other words, the update frequency of the control voltage to be applied to the voltage-controlled oscillator) is 1 Hz, the spurious becomes the largest at frequencies that are multiples of 0.5 Hz, and spurious smaller than at the frequencies of the multiples of 0.5 Hz are also added at frequencies that are multiples of various base frequencies that are less than 0.5 Hz. On the other hand, in this embodiment (solid line in the chart), such a spurious is clearly suppressed and it can be understood that a signal waveform with high purity can be obtained.

Note that, the 1 PPS signal from the 1 PPS signal input terminal 57 shown in FIG. 2 is utilized as a lead for easily and quickly locking the DLL circuit 55 with respect to the one-second-cycle PN code from the PN code input terminal 56, therefore is not essential. That is, in this embodiment, there is no problem even if the 1 PPS signal input terminal 57 of the reference frequency generation device 51 and the head timing signal output terminal 27 of the GPS receiver 11 are omitted.

As described above, the GPS receiver 11 of this embodiment (FIG. 1) includes the baseband processing module 16 and the PN code output terminal 26. The baseband processing module 16 performs the position calculation based on the positioning signals received from the GPS satellites. The PN code output terminal 26 is configured to be able to output, based on the calculation result of the baseband processing module 16, the timing signal synchronized with one second in the UTC according to the PN code repeated every second periodically.

Thereby, as for the machine to be supplied with this timing signal (reference frequency generation device 51), by acquiring the code correlation value at the time intervals shorter than one second, it can control the oscillation of the voltage-controlled oscillator 33. Therefore, the deviation of the oscillating frequency of the voltage-controlled oscillator 33 can be corrected in the early stage, and thereby, the band width of the DLL circuit 55 can be narrowed down and suppress the jitter of for example, the reference timing signal to be outputted from the reference frequency generation device 51. Further, because the control of the voltage-controlled oscillator 33 can be performed with short time intervals, the spurious due to the phase noise can be made to be caused at a part far from the frequency (1 Hz) of the reference timing signal. Therefore, the spurious can be sufficiently reduced by the band limitation of the loop filter 32 of the DLL circuit 55. Thereby, the high quality reference signal can be provided to a user side device.

Further, the GPS receiver 11 of this embodiment is configured to be able to output the timing signal according to the PN code constituted with the pseudonoise.

Thereby, confidentiality of the communication between the GPS receiver 11 and the reference frequency generation device 51 can be achieved. Especially, by spreading spectrum to reduce the spectral density, the signal level can be brought below a noise floor and in this case, further improved confidentiality can be achieved.

Moreover, the GPS receiver 11 of this embodiment includes the head timing signal output terminal 27 for outputting the timing for the code pattern of the PN code that is outputted from the PN code output terminal 26 to return to the beginning, in the form of the 1 PPS signal.

Thereby, the reference frequency generation device 51, by using the above 1 PPS signal, is able to easily search the code pattern of the reference PN code in the DLL circuit 55, and quickly synchronize the code.

Further, the reference frequency generation device 51 of this embodiment (FIG. 2) includes the DLL circuit 55 and the first output terminal 58. The DLL circuit 55 can be locked to the periodic PN code synchronized with one second in the UTC. The first output terminal 58, the second output terminal 59, and the third output terminal 60 transmit the signals from the DLL circuit 55 as the reference signals.

Thereby, for the reference PN code and the internal PN code, which are continuously inputted, their phases can be compared in the DLL circuit 55 at the time intervals shorter than one second. Therefore, the reference signal in which jitter and spurious are sufficiently reduced compared to the conventional art can be obtained.

Further, in the reference frequency generation device 51 of this embodiment, within the three output terminals, the third output terminal 60 that can output the periodic PN code synchronized with the signal from the DLL circuit 55 is included.

Thereby, the PN code with accurate timing, from which, for example, jitter is removed can be provided to the user side device.

Figure 5:
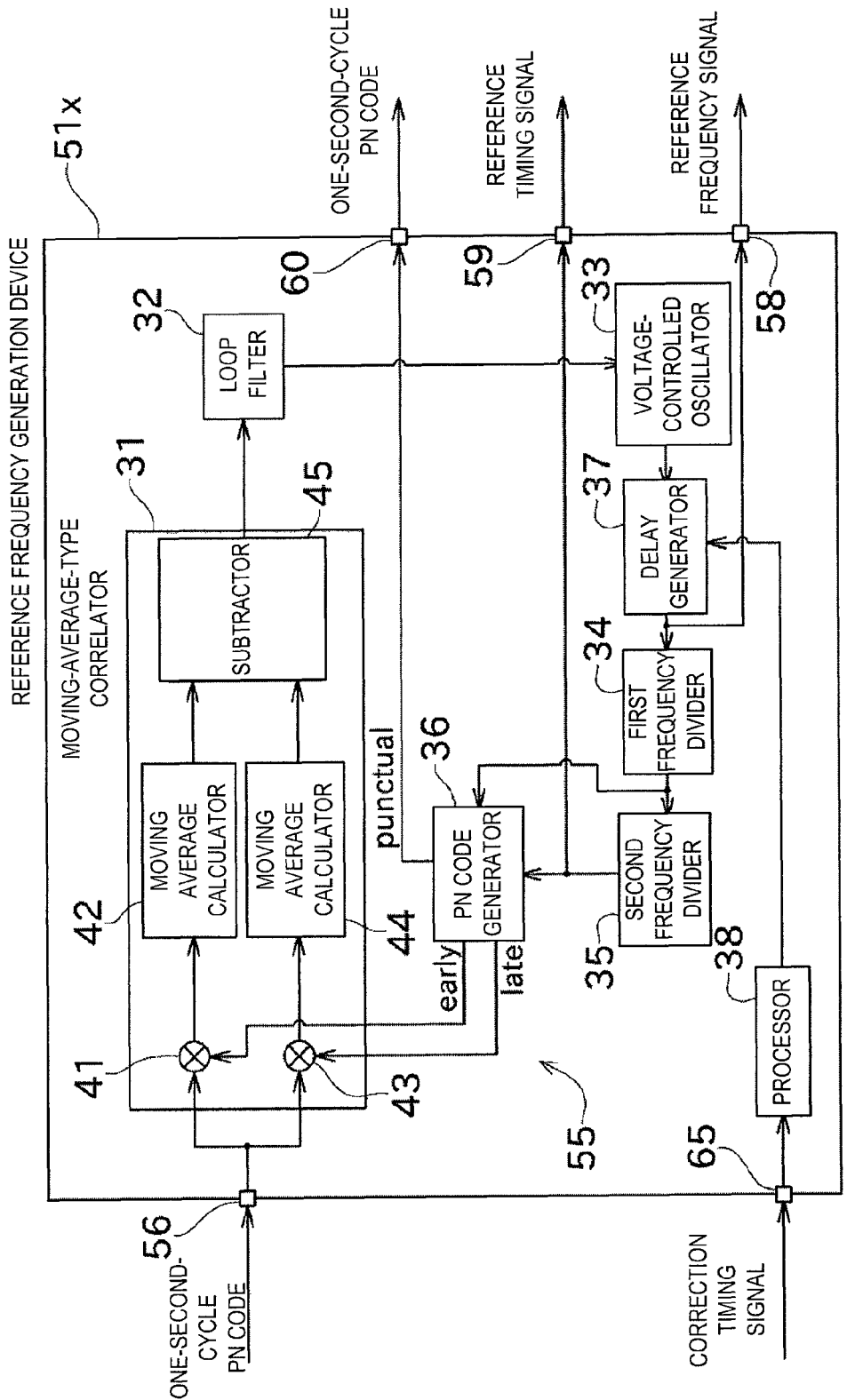
FIG. 5 is a block diagram showing an electrical configuration of a reference frequency generation device of the second embodiment.
Figure 6:
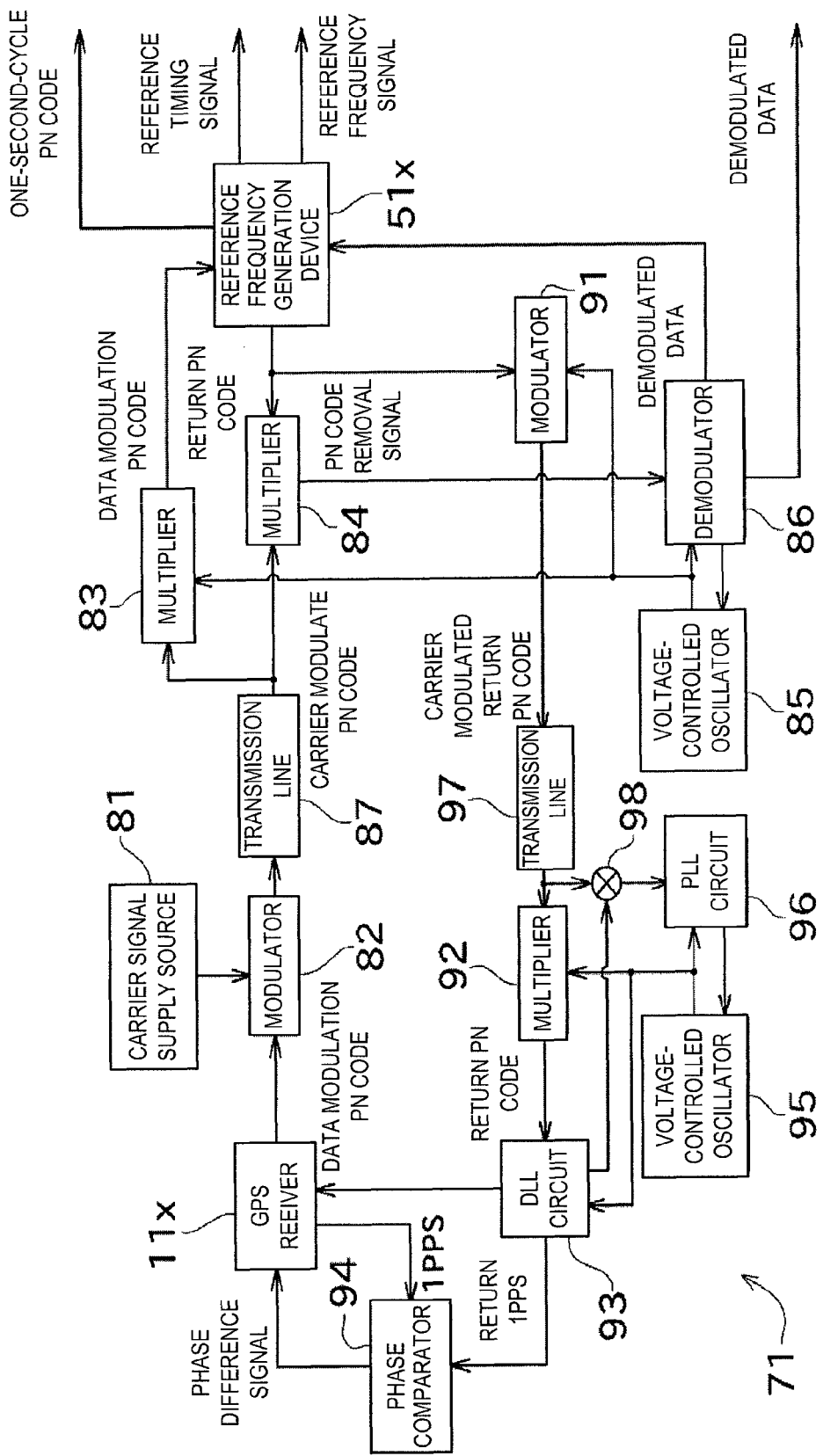
FIG. 6 is a block diagram showing a reference frequency generating system using the GPS receiver and the reference frequency generation device of the second embodiment

Next, a GPS receiver and a reference frequency generation device, and a reference frequency generating system using the same according to a second embodiment are described with reference to FIGS. 4 through 6. Note that, in the description of the second embodiment, the same numerals may be applied to the same or similar configuration as the above first embodiment, and the description thereof may he omitted.

Figure 4:
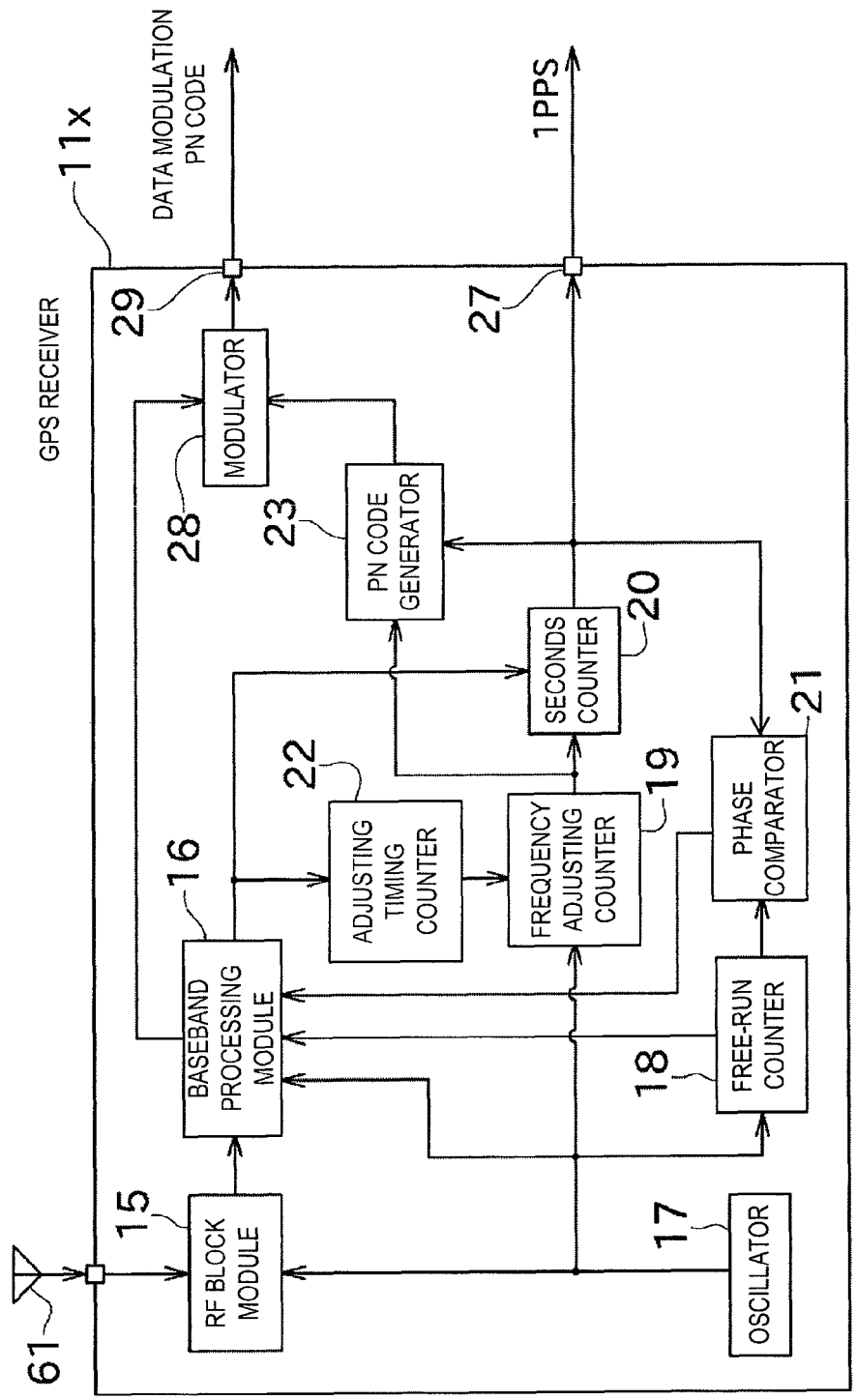
FIG. 4 is a block diagram showing an electrical configuration of a GPS receiver of a second embodiment.

As shown in FIG. 4, a GPS receiver 11x according to the second embodiment has a configuration of the GPS receiver 11 of the first embodiment with a modulator 28 added thereto. In this configuration, the baseband processing module 16 outputs a data signal corresponding to predetermined information to the modulator 28. Then the modulator 28 modulates the data signal by the PN code which is outputted by the PN code generator 23, and the signal can be outputted from a data modulation PN code output terminal 29. Note that, the PN code output terminal 26 included in the first embodiment is omitted in the GPS receiver 11x of this embodiment.

The information that the baseband processing module 16 outputs as the data signal to the modulator 28 is arbitral and may be, for example, information relating to a reception of the radio waves from the GPS satellites, positioning information, time information (TOD), and information relating to an internal state of the GPS receiver 11x, corresponding to an object of the system. Alternatively, it may be correction timing information described later. These information are superimposed on the PN code by the modulator 28 and are outputted from the data modulation PN code output terminal 29.

Next, the reference frequency generation device according to the second embodiment is described. As shown in FIG. 5, this reference frequency generation device 51x has a configuration of the reference frequency generation device 51 of the above first embodiment with a control signal input terminal (delay signal input terminal) 65, a delay generator (adjuster) 37, and a processor 38 added thereto. Note that, the 1 PPS signal input terminal 57 which is equipped in the first embodiment is omitted in the reference frequency generation device 51x of this embodiment.

The control signal input terminal 65 is configured to be able to be inputted with a signal relating to delay of the PN code that is inputted from the PN code input terminal 56 (specifically, the correction timing signal for correcting the delay). This correction timing signal (delay signal) is inputted to the processor 38.

The delay generator 37 generates a signal with a delay with respect to the signal inputted from the voltage-controlled oscillator 33 and outputs it to the first frequency divider 34 and the first output terminal 58. A delay time length (delay amount) of the output signal of the delay generator 37 with respect to the signal inputted from the voltage-controlled oscillator 33 can suitably be changed based on the control signal from the processor 38. Various kinds of configurations may be applied for the delay generator 37. For example, if the output waveform of the voltage-controlled oscillator 33 is sinusoidal, a comparator may be applied as the delay generator 37 and the change in the delay amount can be achieved by changing a threshold of the comparator. Alternatively, other than the comparator, for example a shift register or a delay line may be used as the delay generator 37 and the change in the delay amount can be achieved by selecting one among a plurality of outputs with various delay amounts by a selector. Moreover, instead of achieving the delay by the hardware as described above, the delay may be achieved by software.

The processor 38 controls the delay generator 37 based on the correction timing signal inputted from the control signal input terminal 65 so as to synchronize the reference frequency signal to be outputted from the first output terminal 58, the reference timing signal to be outputted from the second output terminal 59, and the one-second-cycle PN code to be outputted from the third output terminal 60, with one second in the UTC, respectively.

Next, a configuration of a reference frequency generating system (reference signal generating system) 71 where the GPS receiver 11x and the reference frequency generation device 51x of the second embodiment are combined is described with reference to FIG. 6. The reference frequency generating system 71 includes the GPS receiver 11x and the reference frequency generation device 51x. The reference frequency generating system 71 includes a carrier signal supply source 81, a modulator 82, two multipliers 83 and 84, a voltage-controlled oscillator 85, and a demodulator 86, so as to transmit the one-second-cycle PN code and the various information contained in a data modulation PN code that is outputted from the GPS receiver 11x.

The carrier signal supply source 81 is constituted with, for example, a commonly-known oscillator and a PLL circuit, and is configured to be able to output a carrier signal to the modulator 82.

The modulator 82 further modulates the data modulation PN code outputted from the GPS receiver 11x with the carrier signal inputted from the carrier signal supply source 81. Note that, in the following description, the data modulation PN code modulated by the carrier signal may be referred to as the "carrier modulation PN code." The carrier modulation PN code that is outputted by the modulator 82 is inputted to each of the multipliers 83 and 84 through a suitable transmission line 87. Various kinds of configurations are considered as the transmission line 87, such as, an antenna, a coaxial cable, a wire pattern of a printed circuit board, or an AC line for power distribution. Note that, if the AC line for the power distribution is used as the transmission line 87, a signal of the AC line may be used as the carrier signal from the carrier signal supply source 81.

The carrier modulation PN code inputted to the multiplier (demodulator) 83 is demodulated by being multiplied by a signal from the voltage-controlled oscillator 85. The data modulation PN code thus obtained is inputted to the reference frequency generation device 51x (as the one-second-cycle PN code). Similar to the above, in the reference frequency generation device 51x, the one-second-cycle PN code (punctual-PN code), which is generated by the internal PN code generator 36, is controlled to have the highest correlation with the data modulation PN code (one-second-cycle PN code), which is inputted into the reference frequency generation device 51x. Then, the reference frequency signal and the reference timing signal synchronized with this one-second-cycle PN code are outputted to the user side device that is not illustrated. Note that, if the data that is inputted from the demodulator 86 includes timing correction data, the phases of the reference frequency signal and the reference timing signal to be outputted from the reference frequency generation device 51x are suitably advanced so as to cancel the delay occurred when the data demodulation PN code is transmitted from the GPS receiver 11 to the reference frequency generation device 51x.

The multiplier 84 multiplies a return PN code that is generated by the reference frequency generation device 51x by the carrier modulation PN code that is transmitted from the transmission line 87, and thereby, removes the PN code from the carrier modulation PN code. A signal generated by the multiplier 84 as above is outputted to the demodulator 86. Note that, the return PN code is outputted from a return PN code output terminal (return spreading code output terminal), which is not illustrated, provided to the reference frequency generation device 51x. This return PN code output terminal is equipped separately from the third output terminal 60. This return PN code is a one-second-cycle PN code synchronized with the data modulation PN code inputted to the reference frequency generation device 51x, and the data signal is removed from the one-second-cycle PN code. Further, being different from the punctual-PN code that is outputted from third output terminal 60, the phase correction for cancelling the delay as described above is not performed on this return PN code.

The demodulator 86 demodulates the signal inputted from the multiplier 84 based on the signal from the voltage-controlled oscillator 85. Thereby, various data contained in the data modulation PN code that is outputted from the GPS receiver 11x can be acquired. This data contains, for example, information relating to the receptions of the radio waves from the GPS satellites, the positioning information, the time information (TOD), and information relating to the internal state of the GPS receiver 11x. These information are outputted to, for example, the user side device and suitably used.

Further, essentially, the information that is obtained by demodulating the data in the demodulator 86 contains the timing correction data for correcting the delay which occurs while the signal passes through the transmission paths from the GPS receiver 11x to the reference frequency generation device 51x. This timing correction data is outputted from the demodulator 86 to the control signal input terminal (delay signal input terminal) 65 equipped in the reference frequency generation device 51x. Further, the demodulator 86 suitably adjusts a control voltage to be applied to the voltage-controlled oscillator 85 so that the voltage-controlled oscillator 85 oscillates at the same frequency as the carrier signal supply source 81.

Further, the reference frequency generating system 71 includes a modulator 91, a multiplier 92, a DLL circuit 93, a phase comparator (delay amount detector) 94, a voltage-controlled oscillator 95, and a PLL circuit 96, so as to output the return PN code that is outputted by the reference frequency generation device 51x to the GPS receiver 11x side.

The modulator 91 further modulates the return PN code outputted from the reference frequency generation device 51x, with the signal (carrier signal) inputted from the voltage-controlled oscillator 85. Note that, in the following description, the PN code that is modulated by this carrier signal may be referred to as the "carrier modulation return PN code." The carrier modulation return PN code that is outputted by the modulator 91 is inputted to the multiplier 92 and also to a mixer 98, through a suitable transmission line 97. Note that, as for the transmission line 97, similar to indicated examples in the description of the transmission line 87, it may be realized in various kinds of configurations.

The carrier modulation return PN code inputted to the multiplier 92 is demodulated by being multiplied by the signal from the voltage-controlled oscillator 95. The return PN code thus obtained is inputted to the DLL circuit 93.

Although a detailed description of the DLL circuit 93 is omitted, it may be, for example, similar to the configuration of the DLL circuit 55 shown in FIG. 2. This DLL circuit 93 uses the signal from the voltage-controlled oscillator 95 as a sampling clock and, by a code correlation method, generates a 1 PPS signal synchronized with the return PN code inputted from the multiplier 92. Note that, in the following description, this 1 PPS signal may be referred to as the "return 1 PPS signal." The return 1 PPS signal that is outputted from the DLL circuit 93 is inputted to the phase comparator 94. The DLL circuit 93 also generates a PN code that is synchronized with the return PN code and outputs it to the mixer 98. As described above, the carrier modulation return PN code is also inputted to the mixer 98, therefore, only the carrier element is inputted from the mixer 98 to the PLL circuit 96.

The phase comparator 94 compares a phase of the return 1 PPS signal outputted by the DLL circuit 93 with the phase of the 1 PPS signal outputted by the GPS receiver 11x, and generates a signal indicating the phase difference (phase difference signal). This phase difference signal is inputted from the phase comparator 94 to a control input terminal, which is not illustrated, equipped in the GPS receiver 11x.

The PLL circuit 96 suitably adjusts a control voltage to be applied to the voltage-controlled oscillator 95 based on the signal of the carrier element inputted from the mixer 98 so that the voltage-controlled oscillator 95 oscillates in synchronization with the carrier signal.

With the above configuration, the data modulation PN code outputted by the GPS receiver 11x is modulated by the carrier signal in the modulator 82 and transmitted to the transmission line 87. The modulated data modulation PN code is demodulated by the multiplier 83 and inputted to the reference frequency generation device 51x. The reference frequency generation device 51x generates the one-second-cycle PN code (return PN code) synchronized with the inputted data modulation PN code and outputs it to the multiplier 84. The multiplier 84, by multiplying the carrier modulation PN code transmitted from the transmission line 87 by the return PN code inputted from the reference frequency generation device 51x, generates a PN code removal signal and outputs it to the demodulator 86. The demodulator 86 demodulates the data based on the PN code removal signal and outputs the obtained data to the reference frequency generation device 51x and the other device.

Further, the return PN code outputted by the reference frequency generation device 51x is inputted to the modulator 91 and transmitted to the transmission line 97 upon being carrier modulated. The modulated return PN code is demodulated by the multiplier 92 and the obtained return PN code is inputted to the DLL circuit 93. The DLL circuit 93 generates the return 1 PPS signal synchronized with the return PN code, and the phase of the return 1 PPS signal and the phase of the 1 PPS signal of the GPS receiver 11x are compared by the phase comparator 94. The phase comparator 94 generates the phase difference signal indicating the phase difference between the return 1 PPS signal and the 1 PPS signal (delay amount of the return 1 PPS signal) and outputs it to the GPS receiver 11x.

Note that, the GPS receiver 11x can acquire the phase difference as below in alternative to the method of acquiring the phase difference signal from the phase comparator 94 as above. That is, the DLL circuit 93 is configured to be able to transmit the signal indicating position information on the return PN code to the GPS receiver 11x. Then the GPS receiver 11x compares the position information received from the DLL circuit 93 with position information on the PN code generated by the GPS receiver 11x, and thereby, can acquire the information on the phase difference between both the PN codes. In this embodiment, the GPS receiver 11x is configured to suitably select a method of either one of obtaining the phase difference signal from the phase comparator 94 and calculating the phase difference signal based on the positions of the PN codes by the GPS receiver 11x itself, so as to acquire the phase difference between the PN codes.

As above, the phase difference signal obtained by the GPS receiver 11x (or the information on the phase difference) indicates a delay time length caused by the PN code being transferred back and forth between the GPS receiver 11x side and the reference frequency generation device 51x, through the transmission paths including the two transmission lines 87 and 97. Thus, the GPS receiver 11x is configured to generate the timing correction data based on the delay time length, superimpose the data signal corresponding to the timing correction data on the PN code, and output it to the modulator 82. As for the timing correction data, it may be, for example, a delay time length from when the data modulation PN code is outputted from the GPS receiver 11x to when it is inputted, via the transmission line 87 and the like, to the reference frequency generation device 51x (hereinafter, it may be referred to as the "one-way delay time length"). Note that, a variety of methods may be considered as the method of calculating the one-way delay time length, such as, in a case where cables are used as the two transmission lines 87 and 97 and the two cables are designed to have delay amounts matched with each other, for example, by dividing the delay time length obtained from the phase difference signal (information on the phase difference) by two.

The above timing correction data is demodulated by the demodulator 86 and is inputted to the reference frequency generation device 51x. Based on the timing correction data, the processor 38 (adjuster) equipped in the reference frequency generation device 51x controls the delay generator 37 so as to delay each of the phase of the three kinds of PN codes (punctual, early, and late) generated by the PN code generator 36 by the one-way delay time length than normal. Thereby, the DLL circuit 93 controls the voltage-controlled oscillator 33 so as to cancel the delay generated purposely, therefore, each of the reference signals outputted from the first output terminal 58, the second output terminal 59, and the third output terminal 60 is advanced by the one-way delay time length.

Thereby, the delay that is caused when the PN code is propagated through, for example, the transmission path 87 can be corrected, therefore, the user side device can obtain the reference signals further accurately synchronized with one second in the UTC.

Note that, if the GPS receiver 11x is configured such that a plurality of PN code generators 36 are provided, where the generators 36 superimpose different PN codes, and the superimposed PN codes are outputted from the data modulation PN code output terminal 29, communication can be performed in multiple channels. In this case, for example, a plurality of reference frequency generation devices 51x and a plurality of demodulators 86 may be connected in parallel and each of the PN codes may be allocated to the corresponding reference frequency generation device 51x. According to this configuration, the plurality of reference frequency generation devices 51x separately receive the different PN codes and each of the devices can generate a reference signal with an accurate timing.

Further, in the case of the multiple channel configuration, the timing correction data can be calculated for each reference frequency generation device 51x on the GPS receiver 11x side and can be transmitted in the corresponding PN code. Thereby, each of the reference frequency generation devices 51x can individually acquire the one-way delay time length relating to itself and correct the transmission delay. By multiplexing of the communication paths using the code division multiplex access (CDMA) as described above, the GPS receiver 11x and the GPS antenna 61 can be shared and, therefore, an effect on cost reduction is significant.

As described above, the GPS receiver 11x of this embodiment can be configured to output the plurality of PN codes from the data modulation PN code output terminal 29.

In this case, by using a single GPS receiver 11x and the GPS antenna 61, the reference timing signal and the reference frequency signal of the same accuracy can be provided to the plurality of user side devices. Therefore, significant simplification of the configuration of the system and reduction in cost can be achieved.

Further, the GPS receiver 11x of this embodiment includes the modulator 28 that can superimpose the data signal, which relates to the various information, on the PN code and outputs it.

Thereby, the information useful to a user side can be provided in the PN code.

Further, the GPS receiver 11x of this embodiment is configured so as to be able to transmit the timing correction data relating to the transmission delay due to the connecting paths connecting the GPS receiver 11x and the reference frequency generation device 51x where the PN code is outputted thereto.

Thereby, the delay caused by the transmission paths from the GPS receiver 11x to the reference frequency generation device 51x can be corrected on the reference frequency generation device 51x side. Therefore, the further accurate signal can be supplied to the user side device.

Note that, the GPS receiver 11x may control the phase of the PN code, which the GPS receiver 11x itself outputs from the data modulation PN code output terminal 29, through advancing by the transmission delay time length (the one-way delay time length) due to the connecting paths, instead of transmitting the timing correction data. This adjustment of the phase can be performed by the baseband processing module 16 suitably controlling, for example, the seconds counter 20.

Also in this case, the reference frequency generation device 51x can supply the accurate signal to the user side device.

Further, the reference frequency generation device 51x includes the control signal input terminal 65 for inputting the correction timing signal relating to the delay at the time when the PN code is transmitted from the GPS receiver 11x to the reference frequency generation device 51x. Then, the delay generator 37 adjusts the phases of the reference signals to be outputted from the first output terminal 58, the second output terminal 59, and the third output terminal 60, based on the correction timing signal.

Thereby, the delay caused by the transmission paths from the GPS receiver 11x to the reference frequency generation device 51x can be corrected on the reference frequency generation device 51x side. Therefore, a further accurate signal can be supplied to the user side device.

Moreover, the reference frequency generating system 71 includes the modulator 82 and the multiplier 83. The modulator 82 modulates the PN code outputted from the GPS receiver 11x by the carrier signal. The multiplier 83 demodulates the signal, which is modulated and transmitted by the modulator 82, to obtain the PN code. Then, the PN code obtained by the multiplier 83 is inputted to the reference frequency generation device 51x.

Thereby, the PN code can be transmitted to a far distance due to the modulation, positions of the GPS receiver 11x and the reference frequency generation device 51x in relation to each other can flexibly be designed.

Further, in the reference frequency generating system 71 of this embodiment, the reference frequency generation device 51x includes the return signal output terminal for outputting the PN code, which is synchronized with the PN code supplied from the GPS receiver 11x, to transmit it back to the GPS receiver 11x side. Further, the reference frequency generating system 71 includes the phase comparator 94. The phase comparator 94 detects the delay amount in which the return PN code, which is transmitted back to the GPS receiver 11x side by being outputted from the return signal output terminal of the reference frequency generation device 51x, is delayed with respect to the PN code outputted from the GPS receiver 11x.

Thereby, the transmission delay at the time when the PN code is transmitted from the GPS receiver 11x to the reference frequency generation device 51x can be estimated based on the detected delay amount. Therefore, by appropriately correcting the phase of the waveform outputted from the reference frequency generation device 51x, the signal with an accurate timing can be supplied to the user side device.

Some of the suitable embodiments of the present invention are as described above. The above configurations may be modified as follows, for example.

Each of the GPS receivers 11 and 11x generates the PN code based on the signals from the GPS satellites; however, the configuration may be such that the PN code is generated based on satellite(s) of a global positioning system other than the GPS.

The PN code outputted from the PN code output terminal 26 may have the configuration where, for example, a PN code that repeats every 0.5 or 2 seconds, instead of repeating every second. In this case, one pulse signal may be outputted every 0.5 or 2 seconds corresponding to the PN code.

The GPS receivers 11 and 11x may be configured to generate the PN code by the PN code generator built in the baseband processing module 16 instead of generating the PN code by the PN code generator 23.

If the position where the GPS antenna 61 is installed (e.g., latitude and longitude) is already known in advance by, for example, calculation, the baseband processing module 16 may be configured to obtain only the time difference of the clock on GPS receiver side and not calculate, for example, the latitude and longitude. In this case, even if the number of the GPS satellites that the GPS antenna 61 can receive radio waves therefrom is small, the one-second-cycle PN code can stably be outputted.

The GPS receivers 11 and 11x may be configured to output the spreading code in, for example, a frequency hopping direct sequence code division multiple access (FH-CDMA) or a time hopping direct sequence code division multiple access (TH-CDMA), instead of the direct sequence code division multiple access (DS-CDMA) as in the above embodiments.

The frequency of the voltage-controlled oscillator 33 used in each of the reference frequency generation devices 51 and 51x is not limited to 10 MHz, and may be set to other frequencies according to the signal frequency requested by a user. Further, the reference frequency generation devices 51 and 51x may have the configuration where among the first output terminal 58, the second output terminal 59, and the third output terminal 60 may be partly omitted.

In the DLL circuit 55 equipped in each of the reference frequency generation devices 51 and 51x, a PID (PI) controller may be used instead of the loop filter 32. Further, instead of the voltage-controlled oscillator 33 (VCO), a digitally-controlled oscillator (DCO) may be used.

The timings of the signal at 10 MHz outputted from the first output terminal 58 and the signal at 1 Hz outputted from the second output terminal 59 are not necessarily matched with one second in the UTC, and may variously be changed according to the standard defined by the user side device (user system). For example, it may be configured such that the timings of the signals at 10 MHz and 1 Hz are matched with the reference time of the GPS (GNSS).

In the reference frequency generating system 71 of the second embodiment, the reference frequency generation device 51x may digitalize the delay amount obtained from the phase comparator 94 as it is, and superimpose it on the PN code to be outputted to the reference frequency generation device 51x side. In this case, processing of dividing the data by two may be performed on the reference frequency generation device 51x side, where the data is received.

Further, the configuration of the reference frequency generation device 51x may be changed to, instead of outputting the one-second-cycle PN code synchronized with the data modulation PN code inputted thereto as the return PN code, outputting the inputted data modulation PN code itself as the return PN code. Also in this case, the return 1 PPS signal synchronized with the return PN code can be obtained by the DLL circuit 93, and the GPS receiver 11x side can obtain the delay amount similar to the above embodiments.

In the reference frequency generating system 71, all or a part of the multipliers 83 and 84, the voltage-controlled oscillator 85, the demodulator 86, and the modulator 91 may be modified to be built in the reference frequency generation device 51x. Further, all or a part of the multiplier 92, the DLL circuit 93, the phase comparator 94, the voltage-controlled oscillator 95, the PLL circuit 96, the carrier signal supply source 81, and the modulator 82 may be modified to be built in the GPS receiver 11x.

DESCRIPTION OF NUMERALS

11, 11x: GPS Receiver (Timing Signal Supply Device)
16: Baseband Processing Module (Position Calculation Module)
26: PN Code Output Terminal (Spreading Code Output Terminal)
51, 51x: Reference Frequency Generation Device (Reference Signal Generation Device)
55: DLL Circuit (Code Synchronization Circuit)

What is claimed is:

1. A reference signal generating system, comprising:
a timing signal supply device; and
a reference signal generation device;
wherein the timing signal supply device includes:
    a positioning calculation module for performing a positioning calculation based on positioning signals that are received from satellites of a global positioning system; and
    a spreading code output terminal for outputting, based on the calculation result of the positioning calculation module, a timing signal synchronized with a predetermined timing by a periodic spreading code, said timing signal being a one-second-cycle timing signal required for time synchronization, and
wherein the reference signal generation device includes:
    a code synchronizing circuit for being locked to the spreading code supplied from the timing signal supply device;
    a reference signal output module for outputting a signal from the code synchronizing circuit as a reference signal.

2. The reference signal generating system of claim 1, comprising:
a modulator for modulating, by a carrier signal, the spreading code outputted from the timing signal supply device; and
a demodulator for obtaining the spreading code by demodulating the signal that is transmitted after being modulated by the modulator;
wherein the spreading code obtained by the demodulator is inputted to the reference signal generation device.

3. The reference signal generating system of claim 1 or 2, wherein the reference signal generation device includes a return spreading code output terminal for returning by outputting the spreading code supplied from the timing signal supply device or the spreading code synchronized therewith to the timing signal supply device side,
wherein the system comprising a delay amount detector for detecting a delay amount of the return spreading code returned to the timing signal supply device side by being outputted from the return spreading code output terminal, with respect to the spreading code outputted from the timing signal supply device, and
wherein a phase of the reference signal outputted from the reference signal generation device is adjusted based on the delay amount.

4. A timing signal supply device, comprising:
a positioning calculation module for performing a positioning calculation based on positioning signals that are received from satellites of a global positioning system; and
a spreading code output terminal for outputting, based on the calculation result of the positioning calculation module, a timing signal synchronized with a predetermined timing by a periodic spreading code, said timing signal being a one-second-cycle timing signal required for time synchronization.

5. The timing signal supply device of claim 4, wherein the spreading code is a pseudonoise code.

6. The timing signal supply device of claim 4 or 5, comprising a head timing output terminal for outputting a signal relating to a timing when a code pattern of the spreading code returns to the beginning.

7. The timing signal supply device of claim 4, wherein a plurality of spreading codes are superimposed with each other and outputted from the spreading code output terminal.

8. The timing signal supply device of claim 4, wherein another data signal is superimposed on the spreading code and outputted from the spreading code output terminal.

9. The timing signal supply device of claim 4, wherein information relating to a transmission delay caused by a connecting path connecting the timing signal supply device with an output destination device that is a destination of the output of the spreading code.

10. The timing signal supply device of claim 4, wherein a phase of the spreading code to be outputted from the spreading code output terminal is adjusted to correct a transmission delay caused by a connecting path connecting the timing signal supply device with an output destination device that is a destination of the output of the spreading code.

11. A reference signal generation device, comprising:
a code synchronizing circuit for being locked to a periodic spreading code synchronized with a predetermined timing, by a one-second-cycle timing signal for time synchronization; and
a reference signal output module for outputting a signal from the code synchronizing circuit as a reference signal.

12. The reference signal generation device of claim 11, comprising a delay signal input terminal for being inputted with a delay signal that is a signal relating to a delay; and
an adjuster for adjusting a phase of the reference signal to be outputted from the reference signal output module, based on the delay signal.

13. The reference signal generation device of claim 11 or 12, wherein the reference signal output module includes a spreading code output terminal for outputting the periodic spreading code synchronized with the code synchronizing circuit.

* * * * *